United States Patent [19]

Freiberg et al.

[11] 4,031,484
[45] June 21, 1977

[54] PORTABLE CHEMICAL LASER WITH GAS RECIRCULATION

[75] Inventors: Robert J. Freiberg, South Windsor; David W. Fradin, Manchester; Peter P. Chenausky, West Hartford; Frank R. Biancardi, South Windsor, all of Conn.

[73] Assignee: United Technologies Corporation, Hartford, Conn.

[22] Filed: Nov. 11, 1975

[21] Appl. No.: 630,828

[52] U.S. Cl. .............................. 331/94.5 G; 330/4.3
[51] Int. Cl.² ........................................... H01S 3/00
[58] Field of Search ...................... 331/94.5, 94.5 G; 330/4.3

[56] References Cited

UNITED STATES PATENTS

| | | | |
|---|---|---|---|
| 3,614,507 | 10/1971 | Witteman et al. | 331/94.5 X |
| 3,720,885 | 3/1973 | Koloc | 331/94.5 G |
| 3,879,680 | 4/1975 | Naismith et al. | 331/94.5 G |

OTHER PUBLICATIONS

Laser Focus, vol. 8, No. 12, Dec. 1972, pp. 20–21.

*Primary Examiner*—Martin H. Edlow
*Attorney, Agent, or Firm*—Anthony J. Criso

[57] ABSTRACT

A chemical laser having means for repeatedly circulating the gaseous working medium in a portable, self-contained system is disclosed. An excited laser species is formed by chemical means and after passing through the optical cavity, the working medium is purified by selective absorption and adsorption processes, increased in pressure, supplemented with makeup feed reactants and recycled. The operation of a system using deuterium and sulfur hexafluoride gases is discussed in detail although various combinations of other suitable reactants which provide a halogen and hydrogen or an isotope thereof are disclosed.

14 Claims, 2 Drawing Figures

PORTABLE CHEMICAL LASER WITH GAS RECIRCULATION

BACKGROUND OF THE INVENTION

1. Field of Invention

The present invention relates to gas lasers and more particularly to closed cycle gas lasers in which an active species is prepared by chemical reaction and the working medium is circulated repeatedly within a lightweight apparatus which is portable.

2. Description of the Prior Art

In the operation of many gas laser systems, the total mass of the working fluid which is passed through the optical cavity of the system is often considerable, particularly if the system is operated over a long duration of time. One of the early techniques used to reduce the overall consumption of gases in such systems was to recirculate all or a substantial portion of the working medium through the optical cavity, with suitable provision being made in some instances to remove detrimental species which found their way into the system as well as to provide means for adding fresh reactants as necessary. Concepts such as these are discussed in greater detail in U.S. Pat. No. 3,634,778, entitled Closed-Cycle Gas Laser System, U.S. Pat. No. 3,648,194, entitled Semiclosed Cycle Gas Laser System and U.S. Pat. No. 3,668,549, entitled Extended Closed Cycle Gas Laser System.

Laser system performance has been improved also by such techniques as changing either the type of reactant or the method for exciting the working medium. A description of early work relating to chemical laser systems was published by T. V. Jacobson et al in Transversely Pulse Initiated Chemical Lasers in the Chemical Physics Letters, Volume 8, No. 3, February 1971. The article describes producing laser radiation in a hydrogen fluoride system wherein fluorine atoms are derived from a fluorine containing molecule which is subjected to an electric discharge. These atoms are then allowed to react with molecular hydrogen to produce a chemically excited hydrogen fluoride laser species. This effort was elaborated upon in Transversely Pulse Initiated Chemical Laser:Atmospheric Pressure Operation Of An HF Laser published by T. V. Jacobson et al in the Journal of Applied Physics, Volume 42, No. 9, August 1971. A hydrogen fluoride laser capable of relatively high energy output pulses and using a mixture of sulfur hexafluoride and hydrogen which is subjected to a transverse electric discharge was described by H. Pummer et al in Investigation Of A 1-J Pulsed Discharge-Initiated HF Laser published in Applied Physics Letters, Volume 20, No. 9, May 1972. Jacobson et al disclose an extension of their earlier work in A High Repetition Rate Chemical HF Laser, IEEE Journal of Quantum Electronics, April 1973. These materials reflect the type of research effort that was being conducted in chemical laser systems particularly the hydrogen fluoride laser systems using sulfur hexafluoride as a source of fluorine.

A device which is based on some of this early work is described in U.S. Pat. No. 3,863,176, entitled Portable Chemical Laser issued to Martinez et al on Jan. 28, 1975. The system described is a laser device in which an excited gas is produced by chemical means and contained without exhausting to the atmosphere. Consumable cartridges are used to both supply the reactant materials and to receive all of the spent working medium after a single pass through the optical cavity. The system provides output energy for a few seconds and can be charged for reuse by changing both the feed cartridge and the pump cartridge.

SUMMARY OF THE INVENTION

An object of the present invention is to provide a lightweight laser system which is portable and provides an output for an extended period.

According to the present invention, two reactants are combined chemically in the production of an excited molecular species to provide an output of laser energy from a closed flow loop which is lightweight and portable, the working medium being repeatedly circulated through the optical cavity of the loop. The system components include a closed loop conduit through which a working medium may be circulated, sources of a first and a second gas for maintaining the desired composition and pressure of a working medium in the conduit, means for dissociating one of these gases, a region in which an excited species is formed by chemical reaction, an optical cavity for stimulating the emission of radiation from the excited species, a chemical scrubber to selectively remove constituents from the working medium, and recirculating means for pumping the working medium around the closed loop.

One of the primary features of the present invention is the relatively long duration over which a useful output power can be maintained. The working medium is continuously recirculated in a closed loop system allowing the amount of laser radiation produced with a given mass of feed gas to be maximized. The weight of the overall system is significantly reduced relative to a comparable open cycle system since the makeup gas represents only a small fraction of the total mass flow of the working medium. Continual recirculation of the major portion of the working medium significantly reduces the weight of stored gases as well as their containment vessels. A further weight saving is realized with this closed system since the tolerable levels of specific chemical reactants is much higher in a closed system than is possible with a system exhausting to the atmosphere thereby permitting a lightweight scrubber element. In addition, the means for evacuating the working medium from the optical cavity are relatively simple and lightweight since such means must overcome only a relatively small pressure drop differential experienced by the working medium in circulating through the closed loop. The present invention can be operated as a closed system using an electric discharge to dissociate one of the source gases to provide an output of laser energy from a supply of relatively non-toxic reactants which are chemically stable and easy to handle. Sulfur hexafluoride and deuterium are a preferred combination in the present invention to provide a deuterium fluoride excited species; however, alternate sources of halides and hydrogen or deuterium can be readily substituted for these gases.

One of the primary advantages of the present invention is its portableness and the fact that it produces no effluent to present either a safety hazard to personnel or a detectable target in normal environments. The loop system causes a low pressure drop in the working medium which flows therethrough and requires low head producing pumping equipment which in turn consumes a small fraction of the total power consumed in the system. The chemical scrubber is small, lightweight and contains disposable canisters which allow the system to be run essentially indefinitely, provided makeup feed gas is available. Other advantages of the present invention include both the reduced volume of the stored gases which is possible due to the recovery of essentially all of the unused working medium after it has passed through the optical cavity and the concomitant reduction in system weight due to the small size of the containment vessels required for such gas storage.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
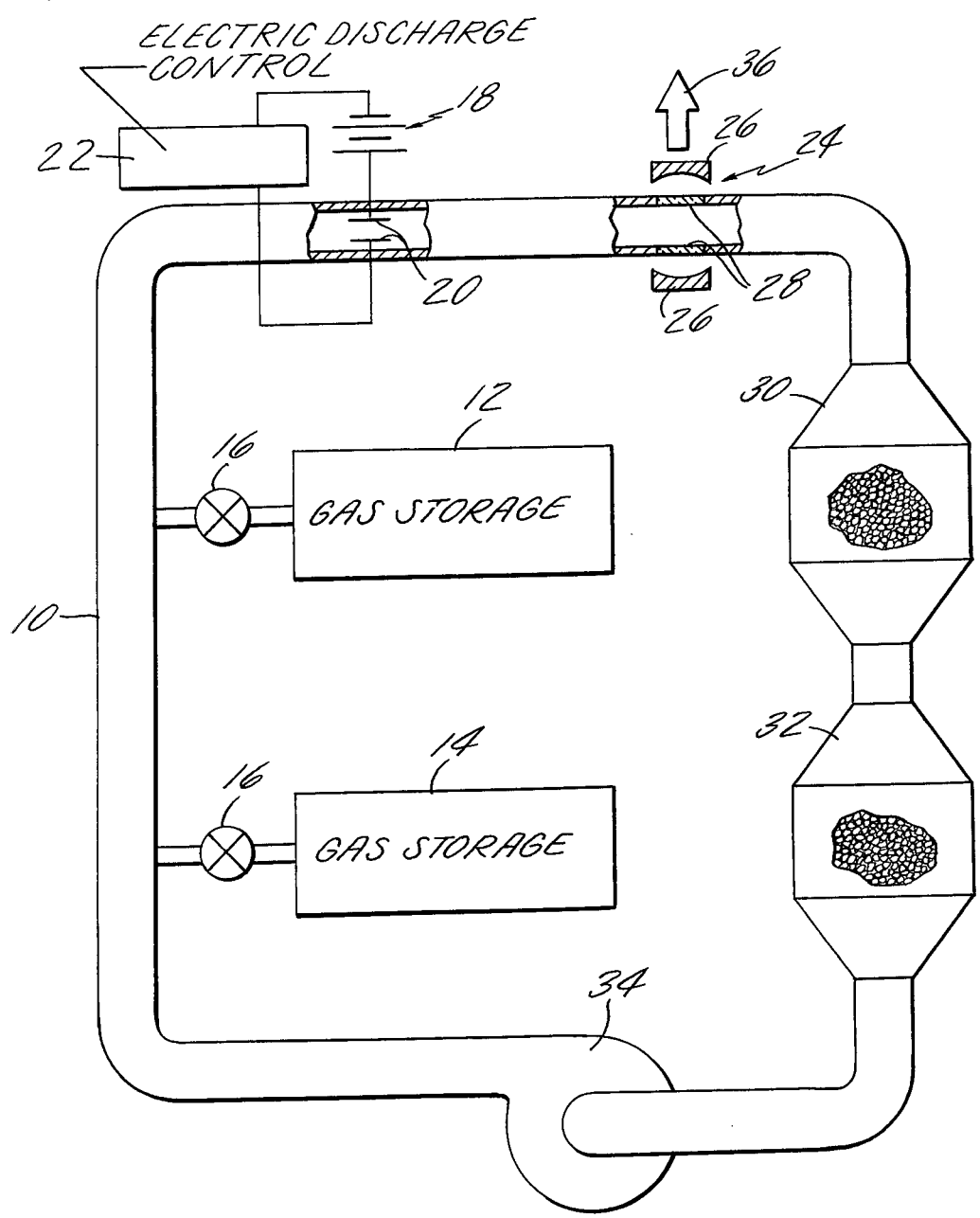
FIG. 1 is a simplified schematic of an overall closed cycle gas laser in accordance with the present invention with partially broken away sections showing the interior of some of the main elements of the system.

A simple apparatus used in the practice of the present invention is shown in FIG. 1. A conduit 10 forms a closed loop within which the main components of the system interact. A first tank 12 containing a first gas and a second tank 14 containing a second gas are connected to the conduit with suitable control valves 16. A power supply 18 is connected across a pair of electrodes 20 which are disposed across the interior of the conduit and connected in series with a discharge control network 22. An optical cavity 24 is formed between mirrors 26, and windows 28 are fitted into the sidewalls of the conduit. A first scrubber 30, a second scrubber 32 and a recirculator 34 are incorporated into the conduit downstream of the optical cavity as shown.

In order to simplify the following description, the operation of the present invention is described on the basis of a mixture of sulfur hexafluoride and deuterium feed gases although it will be evident from the overall disclosure and subsequent discussion that various other gases will operate satisfactorily. To initiate operation of the system the recirculator 34 is activated by energizing a direct current drive motor not shown in the figure. Deuterium gas from the first tank 12 and sulfur hexafluoride from the second tank 14 are admitted to the conduit 10 through gas regulators 16 and proportioned such that the volume of sulfur hexafluoride in the conduit is approximately nine times greater than the volume of the deuterium. This working medium flows in a clockwise direction and passes between the electrodes 20 which are internal to the conduit. Energy from the power supply 18 is deposited between the electrodes 20 in a pulsed manner on a schedule which is controlled by the pulse forming network 22. The action of the electric discharge between the electrodes causes fluorine atoms to become separated from the sulfur hexafluoride gas in the working medium and these free fluorine atoms react with the deuterium gas present in the working medium to form excited deuterium fluoride molecules. Stimulated emission of laser radiation from these excited molecules in the optical cavity provide an output 36 of laser radiation. The working medium then proceeds to the first scrubber 30 which contains a reactive bed of suitable metal hydroxide such as sodium hydroxide pellets which cause selective chemical absorption of the deuterium fluoride passing therethrough. The deuterium fluoride reacts with the hydroxide to form a fluoride salt and deuterium hydroxide or essentially water vapor. The bulk of the salt remain on the hydroxide pellets and the water vapor continues moving through the conduit with the working medium which then passes through the second scrubber 32 containing zeolite in a reactive bed. The zeolite is a highly porous alkaline metal aluminosilicate compound which adsorbs the water vapor and other polar gas contaminants such as sulfur tetrafluoride and unreacted deuterium fluoride which are contained in the working medium after passage through the first scrubber. The composition of the working medium entering the recirculator is essentially sulfur hexafluoride, deuterium and some deuterium fluoride although the amount of the latter is less than about one percent of the total gas volume. The working medium undergoes a pressure rise of a few Torr in passing through the recirculator, and additional amounts of sulfur hexafluoride and deuterium are added as necessary before the operational sequence is repeated.

A preferred type of recirculator construction is described in U.S. Pat. No. 3,875,531, entitled Integrated Laser System. Typically, an electric motor which is powered by a portable energy source drives the recirculator through a magnetic coupler. Gas flow results from the motion of the flexible vanes inside the recirculator which is lighter by as much as an order of magnitude than the mechanical pumps otherwise required in large pressure differential systems.

Under conditions of sustained usage the reactive hydroxide bed in the first scrubber 30 loses its ability to form the fluoride salt and the amount of deuterium fluoride in the working medium increases. At some point the system operation is temporarily halted while a fresh bed of reactive material is inserted into the scrubber. Similarly, the reactive bed in the second scrubber loses its ability to absorb polar gas molecules and the active zeolite must be rejuvenated or replaced. For a system of the type described which provides an average laser output of approximately one watt, the active material in the scrubber functions satisfactorily over operational duration of at least a few hours. In some instances the metal hydroxide bed is removed from the system and only the zeolite is used to remove contaminants. While the processes involved are not fully understood, the system is operational probably because the deuterium fluoride is a polar gas and the zeolite readily removes such gas from the working medium.

The working medium typically contains a one hundred Torr mixture of the nonpolar gases sulfur hexafluoride and deuterium in the approximate ratio of nine to one in addition to small amounts of polar gas contaminants such as deuterium fluoride that accumulate in the gas flow. Because the gases are continuously recirculated through the beds, a fixed weight of scrubber bed material is more effective in removing the polar gas contaminants than is the case when the scrubber beds are used in a single pass nonrecirculating system. In addition, the amount of deuterium fluoride and other noxious gases that must be removed from the gas in open cycle operation in order to reduce the deuterium fluoride concentration to safe levels is as much as two orders of magnitude greater than the amount of noxious gases that must be removed to permit recirculating operation. These facts lead to substantial savings in the weight of scrubber bed materials required for recirculating laser operation.

Since portions of both the sulfur hexafluoride and the deuterium gases are being consumed during each round trip through the closed circuit, both source gases are continuously consumed and eventually the storage tanks become depleted and therefore must be recharged. Several hours of continuous laser operation between tank recharges is possible for a one watt output system having a gas supply mass equal to several moles.

The size and weight of the laser system depend on the average laser output power and the total operating time. For typical applications requiring average power levels of about one watt and a total operating duration of thirty minutes, the laser system can be fabricated as a man-portable device with a total weight, including electrical energy source and gas supply, of less than thirty pounds, a volume of less than two cubic feet, and a shape that can be adjusted either to fit available mounts or to permit convenient operation as a hand-held device.

Although the preferred embodiment of this system uses sulfur hexafluoride and deuterium, other gas mixtures can be used. A buffer gas such as hydrogen can be added to the gas flow. Sulfur hexafluoride can be replaced by carbon tetrafluoride and other freons, tetrafluorohydrozene, nitrogen fluoride or gases containing other halides such as chlorine and bromine. Deuterium may be replaced by deuterated hydrocarbons, hydrogen, or various hydrocarbons such as ethane and xylene. In addition to deuterium fluoride, active laser species that can be used with this system include hydrogen fluoride, hydrogen chloride, hydrogen bromide, hydrogen iodide, deuterium chloride, deuterium bromide and deuterium iodide.

Dissociation of the halide donor by thermal, optical, or chemical means or by an electron beam initiated or sustained discharge can be used instead of dissociation by an electrical discharge. Also, various aspects of the present invention are discussed at length in A Recirculating, Self-Contained DF/HF Pulsed Laser, by D. W. Fradin, P. P. Chenausky and R. J. Freiberg published in IEEE Journal Of Quantum Electronics, Volume QE-11, pages 631–633.

Figure 2:
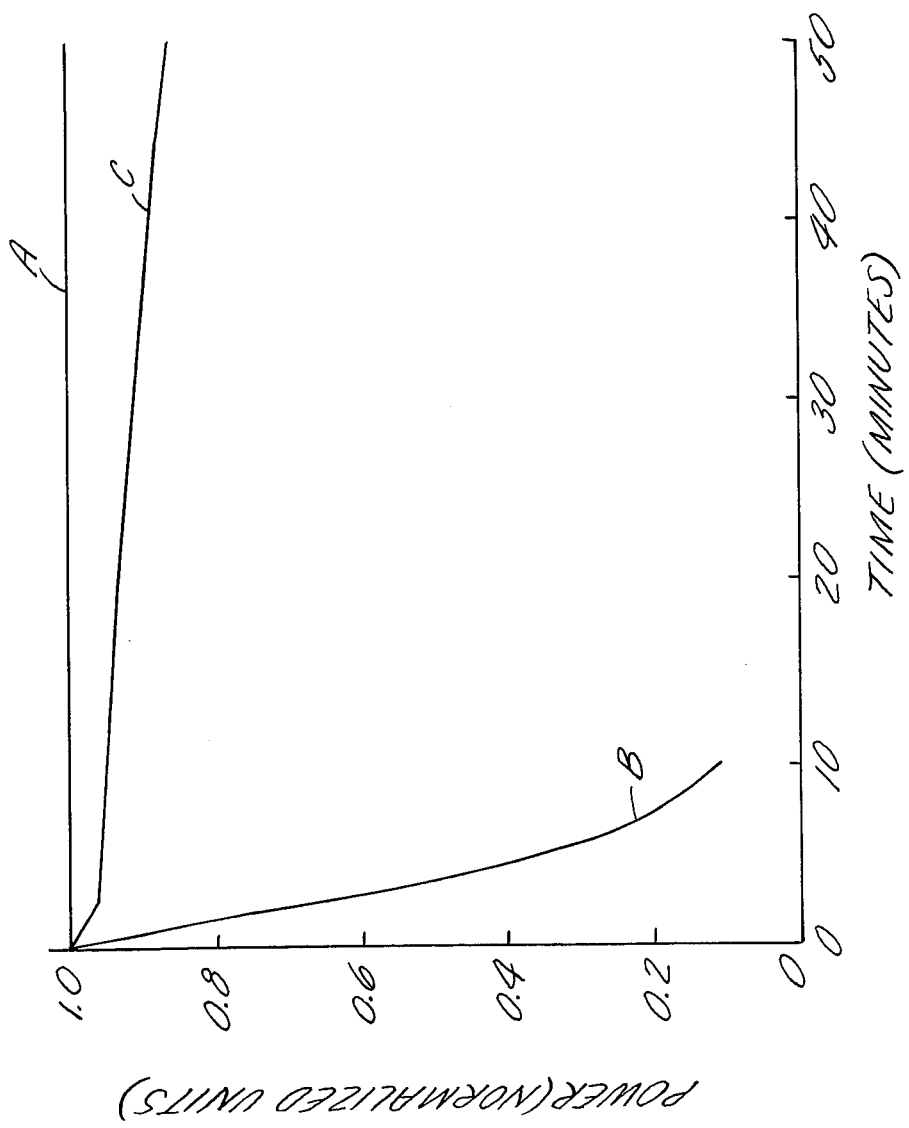
FIG. 2 is a graph showing the relative energy in each pulse of laser radiation from a particular optical cavity operated in either an open cycle or a closed cycle system.

FIG. 2 is a graph which shows the relative energy for a given deuterium fluoride chemical laser as a function of operating time. When the system is run without recirculation of the working medium, the energy in the laser output beam is independent of time and continues as long as fresh reactants are continually fed into the system as is shown by curve A. The energy in the laser output is a maximum under these conditions. When the exhaust from the optical cavity is simply recirculated back through the excitation means and the optical cavity repeatedly, the energy in the laser output rapidly falls off as is illustrated by curve B. The operating characteristic of a chemical laser in accordance with the present invention is displayed vividly by the slope of curve C which represents the energy of the laser output as a function of time for the same chemical laser wherein the working medium is repeatedly circulated through the optical cavity with the addition of a scrubber means located downstream of the optical cavity and upstream of the recirculating means.

With the loop closed and the gases recirculated, less than two percent of the gas flowing through the electric discharge must be replenished. Therefore, the overall gas consumption relative to a comparable open cycle system is reduced by a factor of over fifty.

Although this invention has been shown and described with respect to a preferred embodiment thereof it should be understood by those skilled in the art that various changes and omissions in the form and detail thereof may be made without departing from the spirit and scope of the invention.

Having thus described a typical embodiment of our invention, that which we claim as new and desire to secure by Letters Patent of the United States is:

1. A portable laser system comprising:
  a closed loop circuit through which a gaseous medium may be repeatedly circulated;
  a vessel for the containment of a first gas and a second gas, said vessel being connected to the conduit in a manner which allows these gases to be controllably admitted into the conduit;
  means for causing dissociation of the first gas in the conduit to form a species of atomic gas, such means being downstream of the position at which the first and second gases are admitted into the conduit;
  a reaction region in which the atomic gas and the second gas combine chemically to form an excited species from which laser radiation can be extracted;
  optical means adjacent to the reaction region for extracting laser radiation from the active species;
  scrubber means for removing undesired constituents in the gaseous working medium passed therethrough, the scrubber being positioned in the conduit downstream of the optical means; and
  recirculation means for continuously pumping the working medium around the fluid circuit described by the conduit.

2. A portable laser system comprising:
  a closed loop conduit through which a gaseous working medium may be repeatedly circulated;
  a first vessel for the containment of a first gas, said vessel being connected to the conduit in a manner which allows the first gas to be controllably admitted into the conduit;
  a second vessel for the containment of a second gas, said vessel being connected to the conduit in a manner which allows the second gas to be controllably admitted into the conduit;
  means for causing dissociation of the first gas in the conduit to form a species of atomic gas, such means being downstream of the positions at which the first and second gases are admitted into the conduit;
  optical means for providing laser radiation in a gain region formed in the conduit and either coincident with or immediately downstream of the means for dissociating the first gas;
  scrubber means for removing undesired constituents in the gaseous working medium passing therethrough, the scrubber being positioned in the conduit downstream of the gain region; and
  recirculation means for continuously pumping the working medium around the fluid circuit described by the conduit.

3. The invention according to claim 1 wherein the means for causing dissociation of the first gas comprises a pair of electrodes spaced apart, a source of electrical power for providing an electric potential across the two electrodes, and a discharge control network connected in electrical series between the source of electrical power and the electrodes for applying the electric potential to the electrodes in a controlled manner.

4. The invention according to claim 3 wherein the electric potential forms a discharge across the working medium transverse to the direction of flow of the working medium.

5. The invention according to claim 4 wherein the electric discharge is pulsed.

6. The invention according to claim 1 wherein the scrubber means comprises a first scrubber and a second scrubber.

7. The invention according to claim 6 wherein the first and second scrubbers include removable canister inserts to permit periodic replenishment of fresh reactants.

8. The invention according to claim 6 wherein the first scrubber contains pellets of a metal hydroxide to remove undesired constituents from the gaseous working medium by chemical reaction.

9. The invention according to claim 8 wherein the second scrubber contains pellets of zeolite to remove undesired constituents from the gaseous working medium passing by physical adsorption.

10. The invention according to claim 2 wherein the first and second vessels are detachably connected to the conduit.

11. The invention according to claim 2 wherein the first gas is selected from the group including sulfur hexafluoride, carbon tetrafluoride, a freon, tetrafluorohydrozene and nitrogen fluoride.

12. The invention according to claim 2 wherein the second gas is selected from the group including deuterium, hydrogen, ethane and xylene.

13. The invention according to claim 2 wherein the first gas is sulfur hexafluoride and the second gas is deuterium.

14. The method of operating a portable laser system including the steps of:
admitting a first gas to a closed loop conduit through which a gaseous working medium is continuously recirculated;
admitting a second gas to the closed loop conduit;
dissociating the first gas to form a species of atomic gas;
reacting the species of atomic gas and the second gas chemically to form an excited gaseous species having a population inversion suitable for light amplification by the stimulated emission of radiation;
passing the excited gaseous species through an optical cavity to stimulate the radiation emission;
flowing the working medium through a chemical scrubber to remove undesired constituents from the gaseous working medium;
increasing the pressure of the working medium by passing it through a recirculation means; and
admixing appropriate amounts of the first and second gases to maintain the composition of the working medium within a desired range prior to causing further dissociation of the first gas.

* * * * *

UNITED STATES PATENT OFFICE
CERTIFICATE OF CORRECTION

PATENT NO. : 4,031,484
DATED : June 21, 1977
INVENTOR(S) : ROBERT J. FREIBERG ET AL It is certified that error appears in the above-identified patent and that said Letters Patent are hereby corrected as shown below:

Column 6, line 14     "circuit" should read -- conduit --

Signed and Sealed this

Twenty-seventh Day of September 1977

[SEAL]

Attest:

RUTH C. MASON
Attesting Officer

LUTRELLE F. PARKER
Acting Commissioner of Patents and Trademarks